United States Patent
Shiba et al.

(10) Patent No.: US 11,649,359 B2
(45) Date of Patent: May 16, 2023

(54) COMPOSITION, COATING METHOD, AND MULTILAYER STRUCTURE

(71) Applicant: SHARP KABUSHIKI KAISHA, Sakai (JP)

(72) Inventors: Naoki Shiba, Sakai (JP); Hidetsugu Kawai, Sakai (JP); Shinya Okazaki, Sakai (JP); Kazuhiko Furukawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/883,255

(22) Filed: May 26, 2020

(65) Prior Publication Data

US 2020/0377734 A1 Dec. 3, 2020

(30) Foreign Application Priority Data

May 28, 2019 (JP) .............................. JP2019-099607
Mar. 12, 2020 (JP) .............................. JP2020-043377

(51) Int. Cl.
*C09D 1/02* (2006.01)
*C09D 7/40* (2018.01)
*C09D 7/61* (2018.01)
*C08K 3/22* (2006.01)
*C08K 3/34* (2006.01)

(52) U.S. Cl.
CPC .............. *C09D 1/02* (2013.01); *C09D 7/61* (2018.01); *C09D 7/67* (2018.01); *C09D 7/68* (2018.01); *C09D 7/69* (2018.01); *C08K 3/346* (2013.01); *C08K 2003/2258* (2013.01)

(58) Field of Classification Search
CPC ............ C08K 2003/2258; C08K 3/346; C09D 1/02; C09D 7/61; C09D 7/67; C09D 7/68; C09D 7/69; B01J 35/004; B01J 21/16; B01J 23/30; B01J 31/06; B01J 31/34; B01J 37/0221
See application file for complete search history.

(56) References Cited

U.S. PATENT DOCUMENTS

| 6,146,763 A | 11/2000 | Matsuda | |
| 2002/0006425 A1* | 1/2002 | Takaoka | A61L 9/01 424/405 |
| 2015/0266012 A1* | 9/2015 | Shichi | C09D 7/43 502/80 |
| 2015/0290619 A1* | 10/2015 | Alvarez Berenguer | B01J 35/006 502/84 |
| 2016/0288092 A1* | 10/2016 | Fukushima | C09D 5/1618 |

FOREIGN PATENT DOCUMENTS

| JP | 10323567 | * 12/1998 |
| JP | 2005-035198 A | 2/2005 |
| JP | 2007277403 | * 10/2007 |

OTHER PUBLICATIONS

LAPONITE Technical Information document (24 pages) downloaded on Jan. 9, 2018 from https://www.byk.com/fileadmin/byk/additives/product_groups/rheology/former_rockwood_additives/technical_brochures/BYK_B-RI21_LAPONITE_EN.pdf(Year: 2014).*
Machine translation of JP 2007/277403 https://patentscope.wipo.int/search/en/detail.jsf?docId=JP271190241&_cid=P10-L5LE4B-75736-1 (Year: 2007).*
Machine Translation of JP 10323567 https://patentscope.wipo.int/search/en/detail.jsf?docId=JP267783575&_cid=P10-L5LH64-04199-1 (Year: 1998).*

* cited by examiner

*Primary Examiner* — Callie E Shosho
*Assistant Examiner* — Bethany M Miller
(74) *Attorney, Agent, or Firm* — ScienBiziP, P.C.

(57) ABSTRACT

The composition of the present invention includes tungsten oxide particle, inorganic particle other than tungsten oxide particle, and a solvent. The inorganic particle is preferably made of a clay mineral. The clay mineral is preferably bentonite, saponite, or mica. The volume median diameter ($D_{50}$) of the tungsten oxide particle is preferably 0.01 μm or more and 10.0 μm or less.

14 Claims, 1 Drawing Sheet

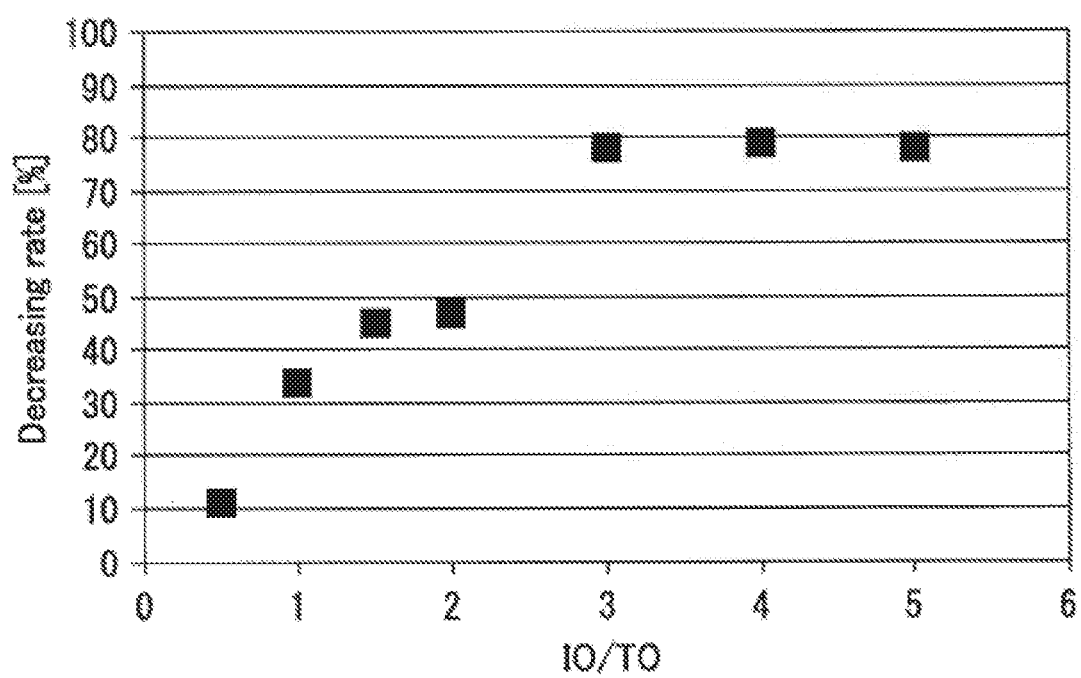

COMPOSITION, COATING METHOD, AND MULTILAYER STRUCTURE

BACKGROUND OF THE INVENTION

Field of the Invention

The present invention relates to a composition, a coating method, and a multilayer structure.

Description of the Background Art

A photocatalyst is a substance that exhibits photocatalytic activity when irradiated with light. Titanium oxide particles are a typical photocatalyst. Titanium oxide particles are used, for example, as a coating material for a base material (for example, on building materials such as wallpaper). However, when the base material is directly coated with titanium oxide particles, the formed coating layer tends not to exhibit sufficient photocatalytic activity. This is because the titanium oxide particles included in the coating layer decompose an organic substance included in the base material, or the base material itself, more preferentially than the original decomposition target. This phenomenon is more pronounced when the base material contains an organic material (for example, when the base material is resin-based wallpaper or the like).

Therefore, as a method of coating a base material with titanium oxide particles, for example, a first method has been proposed which includes the steps of forming a primer layer containing an inorganic material on a base material, and then forming a coating layer containing titanium oxide particles on the primer layer.

Furthermore, in Japanese Unexamined Patent Application Publication No. 2005-35198, for example, a second method has been proposed which includes the step of pasting to wallpaper (base material) a photocatalyst-containing film for wallpaper, in which a plastic film, a primer layer, and a photocatalytic thin-film layer are sequentially laminated. In the first method and the second method, contact between the base material and the photocatalyst can be suppressed by the primer layer.

However, in the first method described above, a step for forming a primer layer on the base material is required. Therefore, the construction is relatively complicated. In addition, in the second method, the manufacturing cost of the laminate tends to increase. Also, because a three-layered structure consisting of a plastic film layer, a primer layer, and a coating layer is laminated on a base material, a sufficient adhesion between the layers may not be achieved in some cases depending on the material of each of the layers.

Further, titanium oxide particles mainly exhibit photocatalytic activity when irradiated with ultraviolet light. Therefore, a coating layer containing titanium oxide particles may not exhibit sufficient photocatalytic activity in some cases under indoor lighting (particularly light-emitting diode (LED) lighting).

The present invention has been made in view of the above disadvantages. An object of the present invention is to provide a composition and a coating method capable of easily and reliably forming a coating layer that exhibits photocatalytic activity when irradiated with visible light. Another object of the present invention is to provide a multilayer structure including a coating layer that exhibits photocatalytic activity when irradiated with visible light, and having excellent productivity.

SUMMARY OF THE INVENTION

A composition according to an embodiment of the present invention includes a tungsten oxide particle, an inorganic particle other than the tungsten oxide particle, and a solvent.

A coating method according to an embodiment of the present invention includes coating the above composition directly on a surface of a base material.

A multilayer structure according to an embodiment of the present invention includes a base material, and a coating layer which is directly coated on a surface of the base material. The coating layer includes a tungsten oxide particle and an inorganic particle other than the tungsten oxide particle.

The composition and the coating method of the present invention are capable of easily forming a coating layer that exhibits photocatalytic activity when irradiated with visible light. The multilayer structure of the present invention includes a coating layer that exhibits photocatalytic activity when irradiated with visible light, and has excellent productivity.

BRIEF DESCRIPTION OF THE DRAWINGS

FIGURE is a graph showing the relationship between the ratio of the content of an inorganic particle with respect to the content of a tungsten oxide particle (IO/TO) and the reduction rate of acetaldehyde.

DESCRIPTION OF THE PREFERRED EMBODIMENTS

Hereinafter, embodiments of the present invention will be described. However, the present invention is in no way limited to the embodiments. The present invention may be implemented with appropriate modifications within the scope of the present invention.

First Embodiment

The composition according to a first embodiment of the present invention includes a tungsten oxide particle, an inorganic particle other than the tungsten oxide particle (hereinafter, sometimes simply referred to as "inorganic particle"), and a solvent. The composition of the present invention is capable of easily forming a coating layer that exhibits photocatalytic activity when irradiated with visible light. The reason for this is thought to be as follows.

The composition of the present invention includes a tungsten oxide particle, which is a photocatalyst that exhibits photocatalytic activity when irradiated with visible light (visible light-responsive photocatalyst). Furthermore, the coating layer formed using the composition of the present invention functions as a barrier material that inhibits the inorganic particle from making contact with the base material and the tungsten oxide particle, even when the composition is directly coated on the base material. Therefore, the composition of the present invention is capable of forming a coating layer that exhibits photocatalytic activity when irradiated with visible light by a simple process that includes only the direct application of the composition on the base material. In addition, the coating layer has a single-layer structure, which enables the adhesion between layers to be easily achieved.

Examples of the organic substance decomposed by the photocatalyst include volatile organic compounds (VOCs), and more specifically, include formaldehyde, acetaldehyde, and ammonia.

Tungsten Oxide Particle

The tungsten oxide particle is a particle containing tungsten oxide as the main component. The content ratio of tungsten oxide in the tungsten oxide particle is preferably 90% by mass or more, and more preferably 97% by mass or more. Examples of the tungsten oxide included in the tungsten oxide particle include $WO_3$ (tungsten trioxide), $WO_2$, $WO$, $W_2O_3$, $W_4O_5$, $W_4O_{11}$, $W_{25}O_{73}$, $W_{20}O_{58}$, and $W_{24}O_{68}$, and mixtures thereof. From the viewpoint of improving the photocatalytic activity of the formed coating layer, the tungsten oxide is preferably $WO_3$.

The crystal structure of the tungsten oxide included in the tungsten oxide particle is not particularly limited. Examples of the crystal structure of tungsten oxide include monoclinic, triclinic, and orthorhombic structures, and mixtures of at least two of these.

The tungsten oxide particle may be composite a particle consisting of a tungsten oxide core particle containing substantially only tungsten oxide, and a promoter supported by the tungsten oxide core particle. As a result of using such composite particles, the photocatalytic activity of the formed coating layer is improved. The tungsten oxide core particle may support only one type of promoter, or may support two or more types of promoters.

Examples of the metal included in the promoter include platinum (Pt), gold (Au), silver (Ag), copper (Cu), zinc (Zn), palladium, iron, nickel, ruthenium, iridium, niobium, zirconium, and molybdenum. For example, these metals may be included in the promoter in the form of complexes, chlorides, bromides, iodides, oxides, hydroxides, sulfates, nitrates, carbonates, acetates, phosphates or organic acid salts. Preferable examples of the promoter include platinum. The tungsten oxide particle is preferably a composite particle consisting of a tungsten oxide core particle and platinum supported by the tungsten oxide core particle as a promoter.

The content ratio of the promoter in the tungsten oxide particle (hereinafter sometimes referred to as promoter loading) is preferably 0.01% by mass or more and 3% by mass or less. As a result of using a promoter loading of 0.01% by mass or more and 3% by mass or less, the photocatalytic activity of the formed coating layer is further improved.

The volume median diameter (hereinafter sometimes referred to as $D_{50}$) of the tungsten oxide particle is preferably 0.01 μm or more and 10.0 μm or less, more preferably 0.15 μm or more and 2.5 μm or less, and even more preferably 0.15 μm or more and 0.5 μm or less. The $D_{50}$ is a 50% cumulative diameter based on volume as measured by a laser diffraction scattering method using a laser diffraction scattering particle size distribution analyzer. The $D_{50}$ of the tungsten oxide particle is a property of the secondary particle of the tungsten oxide particle. Furthermore, when the tungsten oxide particle is a composite particle consisting of a tungsten oxide core particle and a promoter, the $D_{50}$ of the tungsten oxide particle is the $D_{50}$ of the composite particle.

Tungsten oxide particle is a particle having a higher density than other photocatalysts (such as a titanium oxide particle), and have a tendency to settle. Therefore, in order to improve the dispersibility of the tungsten oxide particle, the tungsten oxide particle preferably has a very small $D_{50}$ of 0.01 μm or more and 10.0 μm or less.

The $D_{50}$ of the tungsten oxide particle is preferably smaller than the $D_{50}$ of the inorganic particle. In this manner, by making the $D_{50}$ of the tungsten oxide particle smaller than the $D_{50}$ of the inorganic particle, the dispersibility of the tungsten oxide particle is improved. In addition, the tungsten oxide particle is more easily deposited on the inorganic particle after coating, and contact with the base material is more easily suppressed.

The number average primary particle diameter of the tungsten oxide particle is preferably 500 nm or less, more preferably 200 nm or less, and even more preferably 100 nm or less. The number average primary particle diameter of the tungsten oxide particle is, for example, 10 nm or more. The smaller the number average primary particle diameter of the tungsten oxide particle, the more the specific surface area is increased, and as a result, the photocatalytic activity of the formed coating layer is improved.

The content ratio of the tungsten oxide particle in the composition of the present invention is preferably 0.5% by mass or more and 10.0% by mass or less, and more preferably 1.5% by mass or more and 5.0% by mass or less. As a result of using a content ratio of the tungsten oxide particle of 0.5% by mass or more, the photocatalytic activity of the formed coating layer is improved. As a result of using a content ratio of the tungsten oxide particle of 10.0% by mass or less, the dispersibility of the tungsten oxide particle is improved.

The composition of the present invention may contain only one type of a tungsten oxide particle, or may contain two or more types of tungsten oxide particles. The composition of the present invention may further include, in addition to the tungsten oxide particle, a photocatalyst other than the tungsten oxide particle.

Inorganic Particle

The inorganic particle is a particle containing an inorganic material other than tungsten oxide as the main component. Because the inorganic particle contains an inorganic material as the main component, it is a particle that is not easily decomposed by the photocatalytic activity of the tungsten oxide particle. Therefore, the inorganic particle functions as a barrier material that inhibits contact between the tungsten oxide particle and the base material.

Examples of the inorganic particle include a silica particle, metal particle, and clay minerals. Among these, clay minerals are preferable. The clay mineral may be a natural clay mineral or a synthetic clay mineral.

The clay mineral preferably contains a layered silicate. For example, in the solid state, the layered silicate is constituted by a plurality of laminated layers. Each layer constituting the layered silicate contains at least silicon atoms and oxygen atoms. The layered silicate preferably contains interlayer ion. The interlayer ion is present between the layers of the layered silicate. When a layered silicate containing interlayer ion is dispersed in a solvent, the layers are easily exfoliated and readily dispersed as fine particles in the solvent. After being dispersed as fine particles, the layered silicate more readily inhibits contact between the base material and the tungsten oxide particle in the formed coating layer. Therefore, the composition of the present invention is improved the photocatalytic activity of the formed coating layer by including a layered silicate containing interlayer ion.

The interlayer ion is preferably an alkali metal ion, more preferably a sodium ion ($Na^+$), a potassium ion ($K^+$), or a lithium ion ($Li^+$), and even more preferably a sodium ion. When the layered silicate contains sodium ion as interlayer ion, the layers are even more easily exfoliated when dispersed in a solvent. Therefore, the composition of the present invention is further improved the photocatalytic activity of the formed coating layer by including a layered silicate containing sodium ion as interlayer ion.

Examples of the clay mineral include mica, zeolite, talc, chlorite, kaolinite, illite, glauconite, sericite, and smectite. Examples of smectite include montmorillonite, beidellite, nontronite, stevensite, sauconite, hectorite, saponite, and bentonite (a clay mineral containing montmorillonite as the main component). Bentonite contains, for example, quartz and feldspar as impurities. The clay mineral is preferably smectite or mica, and more preferably bentonite, saponite, or mica.

Note that synthetic products of mica (synthetic mica) include swellable synthetic mica and non-swellable synthetic mica. When synthetic mica is used as the layered silicate, the synthetic mica is preferably swellable mica, which has excellent dispersibility in solvents.

The inorganic particle preferably has alkalinity. Here, the tungsten oxide particle tends to display acidity when dispersed in water. Specifically, the pH of an aqueous dispersion containing 20% by mass of tungsten oxide particle is approximately 2 to 3. Therefore, by using inorganic particle having alkalinity as the inorganic particle, a composite of the inorganic particle and the tungsten oxide particle is more easily obtained in the formed coating layer. Examples of the inorganic particle having alkalinity include bentonite, saponite, and mica. Specifically, the pH of an aqueous dispersion containing 5% by mass of bentonite particles is approximately 9 to 10.

The $D_{50}$ of the inorganic particle is preferably 0.02 μm or more and 20.0 μm or less, more preferably 0.5 μm or more and 20.0 μm or less, even more preferably 1.0 μm or more and 5.0 μm or less, and particularly preferably 1.5 μm or more and 3.0 μm or less. When the $D_{50}$ of the inorganic particle is 0.02 μm or more, the dispersibility of the inorganic particle can be improved. When the $D_{50}$ of the inorganic particle is 20.0 μm or less, settling of the inorganic particle can be suppressed.

The content ratio of the inorganic particle in the composition of the present invention is preferably 0.5% by mass or more and 20.0% by mass or less, and more preferably 2.0% by mass or more and 5.5% by mass or less. When the content ratio of the inorganic particle is 0.5% by mass or more, the inorganic particle more readily function as a barrier material, and the photocatalytic activity of the formed coating layer is improved. When the content ratio of the inorganic particle is 20.0% by mass or less, the coating properties of the composition of the present invention is improved.

The ratio of the content the inorganic particle with respect to the content of the tungsten oxide particle (inorganic particle/tungsten oxide particle) is preferably 0.8 or more and 2.5 or less, and more preferably 1.2 or more and 1.8 or less. When the ratio (inorganic particle/tungsten oxide particle) is 0.8 or more, the inorganic particle more readily function as a barrier material, and the photocatalytic activity of the formed coating layer is improved. When the ratio (inorganic particle/tungsten oxide particle) is 2.5 or less, the coating properties of the composition of the present invention is improved.

Solvent

Examples of the solvent include polar solvents. Examples of polar solvents include water and alcohols (such as methanol, ethanol, and isopropanol). Water is preferred as the solvent.

The composition of the present invention may additionally contain other components (such as a binder and an additive) as necessary.

In the composition of the present invention, the total content ratio of the tungsten oxide particle and the inorganic particle in terms of solid content is preferably 90% by mass or more and 100% by mass or less, and more preferably 99% by mass or more and 100% by mass or less. In this manner, when the total content ratio above is 90% by mass or more and 100% by mass or less, the inorganic particle more readily functions as a barrier material, and the photocatalytic activity of the formed coating layer can be improved.

Viscosity

The viscosity of the composition of the present invention is preferably is 10.0 mPa·s or more and 100.0 mPa·s or less. When the viscosity of the composition of the present invention is 10.0 mPa·s or more and 100.0 mPa·s or less, settling of the tungsten oxide particle is suppressed.

Manufacturing Method

Next, an example of a manufacturing method of the composition according to the present invention will be described. The manufacturing method of the composition according to the present invention includes a tungsten oxide particle forming step, and a mixing step. When a commercially available tungsten oxide particle is used, the tungsten oxide particle forming step may be omitted.

Tungsten Oxide Particle Forming Step

The tungsten oxide particle forming step includes a primary grinding step and a secondary grinding step. The tungsten oxide particle forming step may further include a promoter loading step if necessary.

The primary grinding step will be described. In the primary grinding step, a raw material particle of tungsten oxide is ground in a dispersion medium (wet grinding). As a result of the primary grinding step, the number average primary particle diameter of the raw material particle of tungsten oxide is reduced.

Examples of the dispersion medium used in wet grinding include water and ethanol. Examples of grinders that perform wet grinding include homogenizers, ultrasonic dispersers, and bead mills. In wet grinding, the longer the treatment time, the more the number average primary particle diameter of the raw material particle of tungsten oxide is reduced. Furthermore, when wet grinding is performed using a bead mill, the more the peripheral speed of the bead mill is increased, the more the number average primary particle diameter of the raw material particle of tungsten oxide is reduced.

After the primary grinding step, at least a portion of the dispersion medium is removed from the dispersion containing the ground raw material particle of tungsten oxide. Then, the obtained block is used as the raw material of the secondary grinding step (or the promoter loading step). Examples of the method of removing the dispersion medium include air drying and heat drying. When the promoter loading step is performed after the primary grinding step, the dispersion medium in which the ground tungsten oxide particle is dispersed may be directly used as the raw material (tungsten oxide core particle) of the promoter loading step.

The promoter loading step will be described. In the promoter loading step, a promoter is added to the dispersion medium containing the ground raw material particle of tungsten oxide. Then, by performing loading processing, the ground raw material particle of tungsten oxide is loaded with the promoter. Specific examples of loading processing methods include a heat treatment method, a light precipitation method using ultraviolet light, and a light precipitation method using visible light.

In the promoter loading step, a precursor of the promoter may be added instead of adding the promoter. When a precursor of the promoter is added, the precursor of the promoter is converted into the promoter as a result of heating. Consequently, the ground tungsten oxide particle is loaded with the promoter. When the promoter is platinum, examples of the precursor of the promoter include platinum (II) oxide, platinum(IV) oxide, platinum(II) chloride, platinum(IV) chloride, chloroplatinic acid, hexachloroplatinic acid, tetrachloroplatinic acid, and complexes thereof.

After the promoter loading step, at least a portion of the dispersion medium is removed from the dispersion containing the ground raw material particle of tungsten oxide loaded with the promoter. Then, the obtained block is used as the raw material of the secondary grinding step. Examples of the method of removing the dispersion medium include air drying and heat drying.

The secondary grinding step will be described. In the secondary grinding step, the block obtained in the primary grinding step or the block obtained in the promoter loading step is ground in air (dry grinding). As a result of secondary grinding, the raw material particle of tungsten oxide aggregate, and tungsten oxide particle which is a secondary particle having an appropriate $D_{50}$ are obtained.

Dry grinding is, for example, carried out in air or under an atmosphere of inert gas. Examples of the grinder used for dry grinding include a collision plate grinder (such as a collision plate jet mill), a fluidized bed grinder (such as a fluidized bed jet mill), a mechanical grinder (such as a hammer mill), and a ball mill. Dry grinding is also performed using a mortar and pestle. The longer the treatment time of the dry milling, the more the $D_{50}$ of the tungsten oxide particle is reduced.

The tungsten oxide particle obtained following secondary grinding is directly used in the mixing step, but are preferably used in the mixing step after classification processing. As a result of subjecting the tungsten oxide particle to classification processing, tungsten oxide particle having a more appropriate $D_{50}$ is obtained. Examples of the classifier used for classification include an airflow classifier and a vibrating sieve. The $D_{50}$ of the tungsten oxide particle is adjusted by changing the classification conditions. When a vibrating sieve is used as the classifier, the smaller the mesh size of the sieve, the more the $D_{50}$ of the tungsten oxide particle is reduced.

Mixing Step

In the mixing step, the tungsten oxide particle, the inorganic particle, and the solvent are mixed. This gives the composition of the present invention. In this step, in order to improve the dispersibility of the tungsten oxide particle, it is preferable for the inorganic particle and the solvent to be mixed and stirred, and then for the obtained mixture and the tungsten oxide particle to be mixed and stirred. The mixing and stirring are, for example, performed using a stirrer.

Second Embodiment: Coating Method

A coating method of a second embodiment of the present invention includes coating the composition described in the first embodiment directly on a surface of a base material.

Examples of targets to be subjected to the coating method of the present invention include walls, floors, ceilings and roofs of buildings. The coating method of the present invention is capable of forming a coating layer that exhibits photocatalytic activity when irradiated with visible light to be formed. Therefore, the coating method of the present invention is particularly useful for coating the interior of buildings (for example, the inner walls, floors and ceilings of buildings).

The base material may be a base material containing an inorganic material (such as glass or tile), but base materials containing an organic material (such as resin sheets, nonwoven fabrics, filters or wallpaper) are preferable. More specifically, the base material is preferably resin wallpaper, and more preferably vinyl chloride wallpaper.

Specific methods of directly coating the composition on a surface of a base material include a method consisting of applying the composition to a surface of a base material using a spray, a roller or a brush, and then drying the solvent within the composition. Examples of the method of drying the solvent within the composition include air drying, heating, and blow drying. The coating method of the present invention is capable of forming a coating layer that exhibits photocatalytic activity when irradiated with visible light to be easily formed on the surface of the base material.

In this step, the coating amount in terms of the tungsten oxide particle (the amount of tungsten oxide particle included in 1 m$^2$ of the formed coating layer) is preferably 0.1 g/m$^2$ or more and 5.0 g/m$^2$ or less, and more preferably 0.2 g/m$^2$ or more and 1.0 g/m$^2$ or less. When the coating amount in terms of the tungsten oxide particle is 0.1 g/m$^2$ or more, the photocatalytic activity of the formed coating layer is improved. When the coating amount in terms of the tungsten oxide particle is 1.0 g/m$^2$ or less, excessive coating of the tungsten oxide particle is suppressed.

In the formed coating layer, at least some of the tungsten oxide particles are preferably exposed on the surface of the coating layer, and more preferably protruding from the surface of the coating layer. The tungsten oxide particle that is protruding from the surface of the coating layer form a projection on the surface of the coating layer. Because the tungsten oxide particle exposed on the surface of the coating layer is directly exposed to air, they readily make contact with the decomposition target and readily absorb light. Therefore, the decomposition target is efficiently decomposed.

Third Embodiment: Multilayer Structure

A multilayer structure according to a third embodiment of the present invention includes a base material, and a coating layer which is directly coated on a surface of the base material. The coating layer includes a tungsten oxide particle and an inorganic particle other than the tungsten oxide particle.

The multilayer structure of the present invention is formed by the coating method of the second embodiment. That is to say, the coating layer in the multilayer structure of the present invention is a layer formed by removing the solvent from the composition of the first embodiment. Therefore, the multilayer structure of the present invention includes a coating layer that exhibits photocatalytic activity when irradiated with visible light, and has excellent productivity.

EXAMPLES

Hereinafter, the present invention will be described in more detail using examples. However, the present invention is in no way limited to the examples.

In the present examples, the $D_{50}$ of the tungsten oxide particle was measured using a laser diffraction/scattering particle size distribution measurement device (Microtrac (registered trademark) MT3000II, manufactured by MictrotracBEL Corp.).

Formation of Tungsten Oxide Particle (W-A)
Primary Grinding Step

A bead mill (a media stirring-type wet ultra-fine grinder/disperser "MSC50", manufactured by Nippon Coke & Engineering Co., Ltd.) was used to wet grind 135 g of a raw material particle of tungsten oxide (specifically $WO_3$, manufactured by Kishida Chemical Co., Ltd.) and 1,215 g of ion-exchanged water. This yielded a dispersion of a ground raw material particle of tungsten oxide. Beads (diameter: 0.1 mm, manufactured by Nikkato Corp.) were used in the bead mill. The conditions of the bead mill were set to a peripheral speed of 10 m/sec and a treatment time of 360 minutes. The primary particle diameter of the ground raw material particle of tungsten oxide included in the dispersion was approximately 50 nm. The dispersion was directly used as the raw material of the promoter loading step.

Promoter Loading Step

Hexachloroplatinum (VI) hexahydrate (solid content concentration: 98.5%, manufactured by Kishida Chemical Co., Ltd.) was dissolved in the dispersion of the ground raw material particle of tungsten oxide obtained in the primary grinding step. The amount of hexachloroplatinum (VI) hexahydrate added was an amount that brought the platinum content ratio to 0.025% by mass in the formed tungsten oxide particle (W-A). As a result, a dispersion containing the tungsten oxide particle (W-A) was obtained. The obtained tungsten oxide particle (W-A) was a composite particle consisting of a tungsten oxide core particle and platinum as a promoter. The $D_{50}$ of the tungsten oxide particle (W-A) was 0.2 μm.

Formation of Tungsten Oxide Particle (W-B)

A dispersion containing the tungsten oxide particle (W-A) described above was heated to 100° C. to evaporate the water. As a result, a block containing the tungsten oxide particle (W-A) was obtained. The block was ground using a mortar and pestle. The obtained ground material was sieved using a vibrating sieve, and the ground material passing through a sieve with 63 μm openings was collected. A slurry was prepared by mixing the sieved ground material with pure water. The tungsten oxide particle (W-B) was obtained by spray drying the prepared slurry. The obtained tungsten oxide particle (W-B) was a composite particle consisting of a tungsten oxide core particle and platinum as a promoter. The $D_{50}$ of the tungsten oxide particle (W-B) was 3.1 μm.

Production of Composition

The composition (A-1) and the compositions (B-1) to (B-2) were produced according to the following methods. The composition of each composition is shown in Table 1 below. In Table 1 and Table 3 below, "IO/TO" represents the ratio of the content of the inorganic particle with respect to the content of the tungsten oxide particle (inorganic particle/tungsten oxide particle).

Production of Composition (A-1)

A magnetic stirrer ("REXIM", commercially available from As One Co., Ltd.) was used to stir 4.2 parts by mass of bentonite ("Kunipia (registered trademark) F", manufactured by Kunimine Industries Co., Ltd.) as the inorganic particle, and 81.8 parts by mass of water as the solvent at 1,500 rpm for 180 minutes. As a result, a mixture containing the inorganic particle and the solvent was obtained. To this mixture was added 14.0 parts by mass of the dispersion (concentration: 20% by mass) containing the tungsten oxide particle (W-A), which is a photocatalyst. Then, the product was stirred at 1,500 rpm for 30 minutes. The composition (A-1) was obtained in this manner. Note that "Kunipia (registered trademark) F" is bentonite in which impurities have been removed, and the purity of the main component, montmorillonite, has been raised to the maximum extent possible ($D_{50}$: 2.0 μm).

Production of Composition (B-1)

A magnetic stirrer ("REXIM", commercially available from As One Co., Ltd.) was used to stir 4.2 parts by mass of bentonite ("Kunipia (registered trademark) F", manufactured by Kunimine Industries Co., Ltd.) as the inorganic particle, and 95.8 parts by mass of water as the solvent at 1,500 rpm for 180 minutes. As a result, the composition (B-1) was obtained.

Production of Composition (B-2)

A magnetic stirrer ("REXIM", commercially available from As One Co., Ltd.) was used to stir 5.0 parts by mass of the tungsten oxide particle (W-B), which is a photocatalyst, and 95.0 parts by mass of water as the solvent at 1,500 rpm for 180 minutes. As a result, the composition (B-2) was obtained.

TABLE 1

| Composition | Tungsten oxide particle | | | Inorganic particle | | IO/TO |
| --- | --- | --- | --- | --- | --- | --- |
| | Type | wt % | D50 [μm] | Type | wt % | |
| A-1 | W-A | 2.8 | 0.2 | Bentonite | 4.2 | 1.5 |
| B-1 | — | — | — | Bentonite | 4.2 | — |
| B-2 | W-A | 5.0 | 0.2 | — | — | — |

Example 1

A rectangular resin wallpaper containing vinyl chloride as the main component (length 52 mm, width 76 mm) was used as the base material. The composition (A-1) was applied to one surface of the base material by the spin coating method. In the spin coating method, a "spin coater 1H-DX", manufactured by Mikasa Co., Ltd., was used as the spin coater. This was set to a rotational speed of 1,000 rpm, and the coating amount was set to 14.3 g/m² (the coating amount in terms of tungsten oxide particle was 0.4 g/m²). After the coating was performed, the base material coated with the composition (A-1) was dried on a hot plate at 80° C. for 1 hour. As a result, the sample of Example 1 was obtained, which included the base material (resin wallpaper) and a coating layer containing tungsten oxide particle and inorganic particle.

Measurement of Photocatalytic Activity

The sample of Example 1 was placed in a transparent gas bag having a volume of 0.5 L. The gas bag was filled with a measurement gas (air containing 100 ppm of acetaldehyde), and then the gas bag was sealed. Then, the coating layer of the sample was irradiated with light (center wavelength: 450 nm, illuminance: 2,500 lux) from the outside of the gas bag for 24 hours. After 24 hours from the start of irradiation, the acetaldehyde concentration of the measurement gas in the gas bag was measured. In the measurement using the sample of Example 1, the acetaldehyde concentration of the measurement gas after 24 hours from the start of irradiation was 55 ppm (45% reduction rate). An acetaldehyde gas detector tube ("92", manufactured by Gastec Corp.) was used for the measurement of the acetaldehyde concentration. The tungsten oxide particle exhibits photocatalytic activity by absorbing light, and decompose acetaldehyde into carbon dioxide. Therefore, the higher the photocatalytic activity of the coating layer on the base material, the more the acetaldehyde concentration inside the gas bag decreases.

Comparative Example 1

In Comparative Example 1, other than modifying the aspects below, the sample was prepared and the photocatalytic activity was measured using the same procedure as Example 1. In Comparative Example 1, the composition (B-2) was used instead of the composition (A-1), and the coating amount in the spin coating method was changed to 8.0 g/m$^2$ (coating amount of 0.4 g/m$^2$ of the tungsten oxide particle). In the measurement using the sample of Comparative Example 1, the acetaldehyde concentration of the measurement gas after 24 hours from the start of irradiation was 100 ppm (0% reduction rate).

Comparative Example 2

In Comparative Example 2, one surface of the same base material as the base material used in Example 1 (resin wallpaper) was coated with the composition (B-1) by the spin coating method. In the spin coating method, a "spin coater 1H-DX", manufactured by Mikasa Co., Ltd., was used as the spin coater. This was set to a rotational speed of 1,000 rpm, and the coating amount was set to 50.0 g/m$^2$ (coating amount of 2.1 g/m$^2$ of the inorganic particle). After the coating was performed, the base material coated with the composition (B-1) was dried on a hot plate at 80° C. for 1 hour. This formed a primer layer containing the inorganic particle on the base material. Next, the composition (B-2) was coated on the primer layer by the spin coating method. In the spin coating method, a "spin coater 1H-DX", manufactured by Mikasa Co., Ltd., was used as the spin coater. This was set to a rotational speed of 1,000 rpm, and the coating amount was set to 8.0 g/m$^2$ (coating amount of 0.4 g/m$^2$ of the tungsten oxide particle). After the coating was performed, the base material coated with the composition (B-2) was dried on a hot plate at 80° C. for 1 hour. As a result, the sample of Comparative Example 2 was obtained, which included the base material, a primer layer containing inorganic particle, and a coating layer containing tungsten oxide particle.

The photocatalytic activity was measured for the sample of Comparative Example 2 using the same procedure as that in Example 1. In the measurement using the sample of Comparative Example 2, the acetaldehyde concentration of the measurement gas after 24 hours from the start of irradiation was 0 ppm (100% reduction rate).

The composition (A-1) was a composition including a tungsten oxide particle, an inorganic particle other than the tungsten oxide particle, and a solvent. As shown in Table 2, the composition (A-1) enabled a coating layer that exhibits photocatalytic activity when irradiated with visible light to be easily formed.

In contrast, as illustrated in Comparative Example 1, when the composition (B-2) containing only a tungsten oxide particle was directly coated on the surface of the base material, the formed coating layer barely exhibited photocatalytic activity. This is thought to be because, in the sample of Comparative Example 1, the tungsten oxide particle included in the coating layer made contact with the base material, which caused the vinyl chloride included in the base material to be preferentially decomposed over acetaldehyde.

Furthermore, as illustrated in Comparative Example 2, a coating layer that exhibits photocatalytic activity when irradiated with visible light was obtained when a primer layer was formed in advance on the base material, and then a coating layer was formed on the primer layer with the composition (B-2). However, in Comparative Example 2, the processing for forming a primer layer is required. Therefore, the construction was complicated.

As described below, the particle size of the tungsten oxide particle, the type of inorganic particle, and the content of the inorganic particle in the composition of the present invention were further investigated.

Production of Compositions (A-2) to (A-9)

Other than modifying the aspects below, the compositions (A-2) to (A-9) were produced according to the same production method as the composition (A-1). In the production of the compositions (A-2) to (A-9), the type of tungsten oxide particle, the type of inorganic particle, and the usage amounts were modified as presented in Table 3 below. When a composition has a content ratio of the inorganic particle of 6% by mass or more, the viscosity becomes high and the coating properties are poor. Therefore, in the compositions (A-2) to (A-9), the content ratio of the inorganic particle was set to 5% by mass or less. In Table 3 below, wt % refers to the content ratio (% by mass) of the solid content of each component.

Examples 2 to 9

Other than using the compositions (A-2) to (A-9) instead of the composition (A-1), the samples of Examples 2 to 9 were prepared and the photocatalytic activity was measured using the same procedure as Example 1. The measurement results are shown in Table 3 below. The zeolite used as the inorganic particle in the production of the composition (A-3) was "HSZ (registered trademark) 891HOA", manufactured by Tosoh Corp., having a $D_{50}$ of 4.0 μm.

TABLE 2

| | Coating layer | | | | Acetaldehyde concentration | | |
| --- | --- | --- | --- | --- | --- | --- | --- |
| | Composition | Tungsten oxide particle | Inorganic particle | Primer layer Composition | 0 H [ppm] | 24 H [ppm] | Reduction rate [%] |
| Example 1 | A-1 | W-A | Bentonite | — | 100 | 55 | 45 |
| Comparative Example 1 | B-2 | W-A | — | — | 100 | 100 | 0 |
| Comparative Example 2 | B-2 | W-A | — | B-1 | 100 | 0 | 100 |

TABLE 3

| | | Tungsten oxide particle | | | Inorganic particle | | | Acetaldehyde concentration | | |
|---|---|---|---|---|---|---|---|---|---|---|
| | Composition | Type | wt % | D50 [μm] | Type | wt % | IO/TO | 0 H [ppm] | 24 H [ppm] | Reduction rate [%] |
| Example 1 | A-1 | W-A | 2.8 | 0.2 | Bentonite | 4.2 | 1.5 | 100 | 55 | 45 |
| Example 2 | A-2 | W-B | 2.8 | 3.1 | Bentonite | 4.2 | 1.5 | 100 | 65 | 35 |
| Example 3 | A-3 | W-A | 3.2 | 0.2 | Zeolite | 3.2 | 1.0 | 100 | 91 | 9 |
| Example 4 | A-4 | W-A | 4.2 | 0.2 | Bentonite | 2.1 | 0.5 | 100 | 89 | 11 |
| Example 5 | A-5 | W-A | 3.2 | 0.2 | Bentonite | 3.2 | 1.0 | 100 | 66 | 34 |
| Example 6 | A-6 | W-A | 2.2 | 0.2 | Bentonite | 4.4 | 2.0 | 100 | 53 | 47 |
| Example 7 | A-7 | W-A | 1.5 | 0.2 | Bentonite | 4.5 | 3.0 | 100 | 22 | 78 |
| Example 8 | A-8 | W-A | 1.2 | 0.2 | Bentonite | 4.8 | 4.0 | 100 | 21 | 79 |
| Example 9 | A-9 | W-A | 1.0 | 0.2 | Bentonite | 5.0 | 5.0 | 100 | 22 | 78 |

As is clear from the comparison between Examples 1 and 2, the composition (A-1), which used tungsten oxide particle (W-A) having a relatively smaller $D_{50}$, enabled the formation of a coating layer having a higher photocatalytic activity compared to the composition (A-2), which used tungsten oxide particle (W-B) having a relatively larger $D_{50}$. This is thought to be because, by reducing the $D_{50}$ of the tungsten oxide particle, the tungsten oxide particle is more easily deposited on the inorganic particle in the coating layer. As a result, it becomes easier for contact between the tungsten oxide particle and the base material to be suppressed. Furthermore, an increase in the specific surface area of the tungsten oxide particle, and a reduction in the $D_{50}$, which suppresses settling of the tungsten oxide particle within the composition despite the high density, are also considered to be contributing factors.

As is clear from the comparison between Examples 3 and 5, the composition (A-5), which used bentonite as the inorganic particle, enabled the formation of a coating layer having a higher photocatalytic activity compared to the composition (A-2), which used zeolite as the inorganic particle. Bentonite has a greater gas barrier property than zeolite. Therefore, the use of bentonite as the inorganic particle is considered to be favorable because the gas generated from the base material is blocked by the coating layer.

FIGURE shows a graph that summarizes the ratio of the content of inorganic particle with respect to the content of tungsten oxide particle (IO/TO), and the reduction rate (decreasing rate) of acetaldehyde in Example 1, and Examples 4 to 9. As is clear from FIGURE, the higher the ratio (IO/TO), the more a coating layer having a high acetaldehyde reduction rate (having a high photocatalytic activity) could be formed. However, as the ratio (IO/TO) was increased, there was a tendency for the viscosity of the composition to increase, and for the coating properties to decrease. Therefore, Examples 1 and 6 (particularly Example 1) were preferable from the viewpoint of striking a balance between the coating properties and the photocatalytic activity of the formed coating layer.

As described below, the type of inorganic particle introduced to the composition was further investigated.
Production of Compositions (A-10) and (A-11)

Other than modifying the aspects below, the compositions (A-10) and (A-11) were produced according to the same production method as the composition (A-1). In the production of the compositions (A-10) and (A-11), the type of inorganic particle was modified as presented in Table 4 below. In Table 4 below, wt % refers to the content ratio (% by mass) of the solid content of each component.

Inorganic Particle

The inorganic particle used in producing the compositions (A-10) and (A-11) is described below.

Saponite: "Sumecton (registered trademark) SA", manufactured by Kunimine Industries Co., Ltd., synthetic saponite (not containing crystalline silica due to being a synthetic product), $D_{50}$: approximately 0.05 μm Mica: "ME-200", manufactured by Katakura & Co-op Agri Corp., swellable synthetic mica, $D_{50}$: approximately 13.0 μm Example 10

A rectangular resin wallpaper containing vinyl chloride as the main component (length 52 mm, width 76 mm) was used as the base material. The composition (A-10) was applied to one surface of the base material by the spin coating method. In the spin coating method, a "spin coater 1H-DX", manufactured by Mikasa Co., Ltd. was used as the spin coater. This was set to a rotational speed of 1,000 rpm, and the coating amount in terms of tungsten oxide particle was set to 0.4 g/m² (the total coating amount of the tungsten oxide particle was 1.6 mg). After the coating was performed, the base material coated with the composition (A-10) was dried on a hot plate at 80° C. for 1 hour. As a result, the sample of Example 10 was obtained, which included the base material (resin wallpaper) and a coating layer containing tungsten oxide particle and inorganic particle.
Measurement of Photocatalytic Activity The sample of Example 10 was placed in a transparent gas bag having a volume of 1.0 L. The gas bag was filled with a measurement gas (air containing 100 ppm of acetaldehyde), and then the gas bag was sealed. Then, the coating layer of the sample was irradiated with light (center wavelength: 450 nm, illuminance: 23,000 lux) from the outside of the gas bag for 24 hours. After 24 hours from the start of irradiation, the acetaldehyde concentration of the measurement gas in the gas bag was measured. In the measurement using the sample of Example 1, the acetaldehyde concentration of the measurement gas after 24 hours from the start of irradiation was 82 ppm (18% reduction rate). An acetaldehyde gas detector tube ("92", manufactured by Gastec Corp.) was used for the measurement of the acetaldehyde concentration.

Example 11

Other than using the composition (A-11) instead of the composition (A-10), the sample of Examples 11 was prepared and the photocatalytic activity was measured using the same procedure as Example 10. The measurement results are shown in Table 4 below.

TABLE 4

| | Tungsten oxide particle | | | | Inorganic particle | | | Acetaldehyde concentration | | |
|---|---|---|---|---|---|---|---|---|---|---|
| | Composition | Type | wt % | D50 [μm] | Type | wt % | IO/TO | 0 H [ppm] | 24 H [ppm] | Reduction rate [%] |
| Example 10 | A-10 | W-A | 0.8 | 0.2 | Saponite | 0.8 | 1.0 | 100 | 82 | 18 |
| Example 11 | A-11 | W-A | 1.0 | 0.2 | Mica | 1.0 | 1.0 | 100 | 77 | 23 |

As is clear from Examples 10 and 11, the compositions (A-10) and (A-11) using saponite or mica as the inorganic particle enable a coating layer that exhibits photocatalytic activity when irradiated with visible light to be easily and reliably formed in a similar manner to the compositions (A-1) to (A-9). From the above, it was confirmed that, in the composition of the present invention, at least bentonite, zeolite, saponite, and mica is used as the inorganic particle.

The composition and the coating method of the present invention can be used for coating building materials. The multilayer structure of the present invention is used for the interior of a building.

What is claimed is:

1. A composition comprising:
   tungsten oxide particles;
   inorganic particles other than the tungsten oxide particles; and
   a solvent, wherein
   the inorganic particles are made of a clay mineral,
   a total content ratio of the tungsten oxide particles and the inorganic particles in terms of solid content is 90% by mass or more and 100% by mass or less,
   a ratio of a content of the inorganic particles with respect to a content of the tungsten oxide particles is 0.8 or more and 2.5 or less,
   the clay mineral is bentonite or mica, and
   the tungsten oxide particles, the inorganic particle, and the solvent are contained in a solution.

2. The composition according to claim 1, wherein the inorganic particles have alkalinity.

3. The composition according to claim 1, wherein the clay mineral includes a layered silicate.

4. The composition according to claim 3, wherein the layered silicate includes an interlayer ion, and the interlayer ion is a sodium ion.

5. The composition according to claim 1, wherein a volume median diameter ($D_{50}$) of the tungsten oxide particles is smaller than a volume median diameter ($D_{50}$) of the inorganic particles.

6. The composition according to claim 1, wherein the volume median diameter ($D_{50}$) of the tungsten oxide particles is 0.01 μm or more and 10.0 μm or less.

7. The composition according to claim 1, wherein the volume median diameter ($D_{50}$) of the inorganic particles is 0.02 μm or more and 20.0 μm or less.

8. The composition according to claim 1, wherein the solvent includes water.

9. A coating method comprising:
   coating the composition according to claim 1 directly on a surface of a base material.

10. The coating method according to claim 9, wherein the base material includes an organic material.

11. The composition according to claim 1, wherein the inorganic particles have a volume median diameter ($D_{50}$) of 1.0 μm or more and 20.0 μm or less, and the tungsten oxide particles have a volume median diameter ($D_{50}$) of 0.01 μm or more and 0.5 μm or less.

12. The composition according to claim 1, wherein the composition has a viscosity of 10.0 mPa·s or more and 100.0 mPa·s or less.

13. The composition according to claim 1, wherein the clay material is bentonite.

14. A multilayer structure comprising:
   a base material; and
   a coating layer directly coated on a surface of the base material, wherein
   the coating layer includes tungsten oxide particles and inorganic particles other than the tungsten oxide particles,
   the inorganic particles are made of a clay mineral,
   a total content ratio of the tungsten oxide particles and the inorganic particles in the coating layer is 90% by mass or more and 100% by mass or less,
   a ratio of a content of the inorganic particles with respect to a content of the tungsten oxide particles is 0.8 or more and 2.5 or less,
   the clay mineral is bentonite or mica, and
   the coating layer is a single-layer structure.

* * * * *